UNITED STATES PATENT OFFICE.

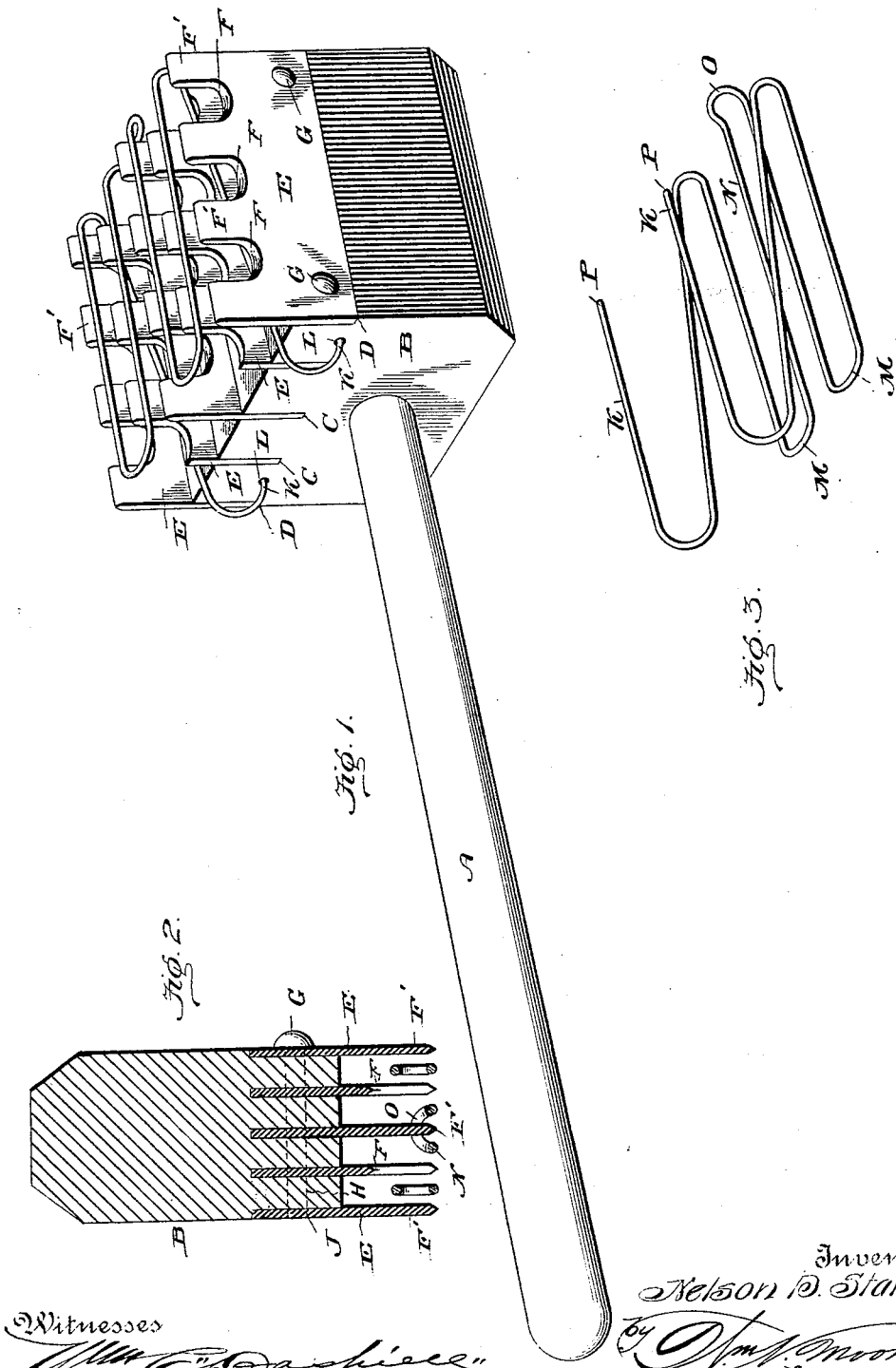

NELSON D. STANLEY, OF ESSEX JUNCTION, VERMONT.

MEAT-TENDERER.

SPECIFICATION forming part of Letters Patent No. 633,740, dated September 26, 1899.

Application filed December 28, 1898. Serial No. 700,489. (No model.)

*To all whom it may concern:*

Be it known that I, NELSON D. STANLEY, a citizen of the United States, residing at Essex Junction, in the county of Chittenden and State of Vermont, have invented certain new and useful Improvements in Meat-Tenderers, of which the following is a specification.

My invention relates to improvements in meat-tenderers; and the main object of my invention is the provision of a meat-tenderer which has detachable means for making the meat tender and for preventing the meat from clinging to the device.

Another object of my invention is the provision of a meat-tenderer which is very simple, durable, and cheap, thus producing a very useful and practical article.

To attain the desired object, the invention consists of a meat-tenderer embodying novel features of construction substantially as disclosed herein.

Figure 1 is a perspective view of my improved meat-tenderer. Fig. 2 is a vertical central section view of the head thereof, and Fig. 3 is a perspective view of the device for preventing the meat from clogging or clinging to the device.

In the drawings, A designates the handle of my device, and B designates the head or block, secured to said handle. I form grooves C in the lower part of this head and form the cut-away portions D, which are the same depth as the grooves and parallel to the grooves for the reception of the blades E, whose cutting edges are serrated or notched to form the lower cutters F and the upper cutters or teeth F', the teeth upon each alternate one being opposite each other, so that the meat will be more thoroughly acted upon and made tender. To hold these blades more tightly in place, I employ the bolts or rivets G, which pass through the openings H and J in the block and blades, respectively, and thus it will be seen that should any of the blades become dull or broken they may be removed and be sharpened or be replaced by new ones.

To keep the spaces in between the blades from being clogged with the broken fibers of the meat and to keep the same from clinging to the sides of the blades, I employ the device shown in Fig. 3, which consists of the single piece of wire bent to form the two arms K, which are adapted to enter the openings L, formed in the body of the head and extend parallel to the grooves therein, and the two fingers or bails M, which meet together to form the end of a third oppositely-extending finger N, whose end is bent to form a hook O to fit over the end of the central blade to hold the device in place, and thus it will be seen that the ends P allow the device to enter the openings in the head and the fingers to fit in their respective places between the blades, forming springs which allow the fingers to be forced up and down as the head is brought down upon the meat and raised to allow the meat to be treated properly and to expel all fragments of the fibers of the meat as the head is raised, thus preventing the clogging of the blades, which is of vital importance, as it renders the device thoroughly clean and desirable.

Thus it will be seen that I provide a simple, durable, and inexpensive meat-tenderer which will thoroughly treat the meat by pounding it and separating the fibers thereof, thus producing a very useful and practical article.

I claim—

1. A meat-tenderer consisting of a head, a series of parallel-arranged knives carried by said head, and a meat-expelling device, formed of a single piece of material having arms or terminals fitting detachably in the head and formed with spring-bails arranged between the knives, with the closed ends of the bails bent down to prevent accidental detachment.

2. In combination with a meat-tenderer consisting of a handled block having a series of cutting edges or knives secured therein, and a pair of parallel openings in the body thereof, of a meat-expeller made of a single piece of metal and bent to form the two parallel terminals adapted to enter the openings in the block, two spring-arms leading therefrom, two spring fingers or bails extending in opposite directions to said arms, and a third finger formed by the inner sides of said fingers or bails and terminating in a hook to more securely hold the expeller in place.

3. In combination with a meat-tenderer, consisting of a handle carrying a head provided with sockets, a series of knives secured in the head and having alternate upper and lower cutting edges, and two parallel openings in the body of the block or head parallel with said sockets, of a meat-expeller made of a single piece of metal and bent to form the two parallel terminals adapted to enter the openings in the head, two spring-arms leading therefrom, two spring fingers or bails extending in opposite directions to said arms, and a third finger formed by the inner sides of said fingers or bails and terminating in a hook to more securely hold the expeller in place.

4. In combination with a meat-tenderer, consisting of a head provided with cutting edges or knives and a pair of parallel openings formed in the body thereof, of a meat-expeller made of a single piece of material and bent to form two parallel terminals adapted to enter the openings in the head, two spring-arms leading therefrom, two spring fingers or bails extending in opposite directions to said arms, and a third finger formed by the inner sides of said fingers or bails and terminating in a hook to more securely hold the expeller in place.

In testimony whereof I affix my signature in presence of two witnesses.

NELSON D. STANLEY.

Witnesses:
M. A. BINGHAM,
IRMA W. BEACH.